US012475431B1

(12) United States Patent
Chandler-Bradley et al.

(10) Patent No.: US 12,475,431 B1
(45) Date of Patent: Nov. 18, 2025

(54) SECURE PHARMACEUTICALS DELIVERY CONTAINER AND SERVICE

(71) Applicant: UIPCO, LLC, San Antonio, TX (US)

(72) Inventors: Jennifer Marie Chandler-Bradley, Wesley Chapel, FL (US); Charlotte Thomas Creech, San Antonio, TX (US); Bianca Gonzalez, Fair Oaks Ranch, TX (US); David Joaquin Harris, San Antonio, TX (US); Brandy Lynne Hartwig, Colo, IA (US); Nickolaus Wayne O'Neal, Adkins, TX (US); Ric M. Peña, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/955,007

(22) Filed: Nov. 21, 2024

Related U.S. Application Data

(60) Provisional application No. 63/601,906, filed on Nov. 22, 2023.

(51) Int. Cl.
*G06Q 10/0836* (2023.01)
*B65D 81/18* (2006.01)
(Continued)

(52) U.S. Cl.
CPC ......... *G06Q 10/0836* (2013.01); *B65D 81/18* (2013.01); *G06Q 10/0832* (2013.01); *G07C 9/00896* (2013.01); *G07C 9/37* (2020.01); *H04W 4/021* (2013.01); *B65D 2401/00* (2020.05); *G07C 2009/0092* (2013.01)

(58) Field of Classification Search
None
See application file for complete search history.

(56) References Cited

U.S. PATENT DOCUMENTS 10,097,353 B1 * 10/2018 Carlson ................. H04L 67/306
12,159,256 B1 * 12/2024 Zeng ..................... G06T 19/006
(Continued)

OTHER PUBLICATIONS

Hassija, Vikas et. al; "A Survey on Supply Chain Security: Application Areas, Security Threats, and Solution Architectures"; Apr. 15, 2021; IEEE Internet of Things Journal, vol. 8, No. 8; pp. 6222-6246; https://ieeexplore.ieee.org/stamp/stamp.jsp?tp=&arnumber=9203862 (Year: 2021).*

(Continued)

*Primary Examiner* — Shannon S Campbell
*Assistant Examiner* — David G. Godbold
(74) *Attorney, Agent, or Firm* — Plumsea Law Group, LLC

(57) ABSTRACT

A secure container for transport of pharmaceuticals includes an onboard computing system, sensor devices, and tamper response mechanisms. The container can collect geodata to determine when it is in range of a target destination for a recipient. The recipient will be permitted to request access to the contents of the container only when the container is in designated range. In addition, if the container detects a tamper event where force is applied in order to open the container, a tamper response can be triggered that releases a neutralization agent and causes any chemical compounds held in the container to become inert.

20 Claims, 13 Drawing Sheets

(51) Int. Cl.
*G06Q 10/0832* (2023.01)
*G07C 9/00* (2020.01)
*G07C 9/37* (2020.01)
*H04W 4/021* (2018.01)

(56) References Cited

U.S. PATENT DOCUMENTS

| | | | | |
|---|---|---|---|---|
| 2011/0231217 A1* | 9/2011 | Hand | ............... | G06Q 10/047 |
| | | | | 707/E17.108 |
| 2012/0032117 A1* | 2/2012 | Ambrozy | ............... | G01K 5/48 |
| | | | | 252/408.1 |
| 2014/0187842 A1* | 7/2014 | Holaday | ............... | B09B 3/35 |
| | | | | 588/313 |
| 2018/0357848 A1* | 12/2018 | McLellan | ............... | G06Q 50/60 |
| 2021/0264702 A1* | 8/2021 | Neeld | ............... | G01R 31/371 |
| 2022/0180306 A1* | 6/2022 | Pärnpuu | ............... | G06Q 10/0832 |

OTHER PUBLICATIONS

Ekwall et al.; "Theft of pharmaceuticals during transport in Europe"; Journal of Transportation Security; Published Oct. 22, 2015; 17 pages.

* cited by examiner

SECURE PHARMACEUTICALS DELIVERY CONTAINER AND SERVICE

CROSS-REFERENCE TO RELATED APPLICATION

This application claims the benefit of U.S. Provisional Patent Application Ser. No. 63/601,906 filed on Nov. 22, 2023 and titled "Secure Pharmaceuticals Delivery Container and Service", the disclosure of which is incorporated by reference herein in its entirety.

TECHNICAL FIELD

This disclosure relates generally to systems and methods for delivering chemical compounds, and more particularly to a secure container for transport of medicines and other pharmaceuticals.

BACKGROUND

The pharmaceutical industry is traditionally a driver in modern economies and interest in this sector from criminal and organized crime groups has increased significantly in recent years. The increasingly desirability of committing pharmaceutical theft is compounded by the fact that pharmaceuticals are considered a primary good that cannot be replaced. In addition, there is a growing worldwide demand for pharmaceuticals, and consumption is increasing. These goods are also listed at higher price points, because of their high commercial value. Furthermore, pharmaceuticals are typically held in a state of restricted access, and so no free market exists for all pharmaceuticals. Finally, the fact that pharmaceuticals are of small size and represent low weight products, they are relatively easy to hide and redistribute following theft. These and other factors can lead to criminals attempting to supply fake or stolen pharmaceuticals in order to meet the black-market demand. Estimations of the illegal market for pharmaceuticals are set to 6-10% of the total market value for counterfeited products. However, most attempts to address pharmaceutical crimes have focused on the counterfeiting part of the problem and far less attention has been given to the theft of pharmaceuticals.

There is a need in the art for a system and method that addresses the shortcomings discussed above.

SUMMARY

In one aspect, embodiments include a method of secure pharmaceutical transportation. The method includes a first step of receiving at a first time, at an onboard computing system for a container and from an onboard location sensor, first geodata indicating the container is within a first range of a first target property, the container holding a payload of one or more chemical compounds. The method also includes a second step of transitioning, responsive to receiving the first geodata, the container from a first state in which container access requests are blocked to a second state in which container access requests are permitted. A third step includes receiving at a second time after the first time, at the onboard computing system, a first request for access from a first user at the first target property, the request accompanied by one or more of biometric data and a passcode. Furthermore, a fourth step includes verifying that the first user is an authorized recipient of the payload. A fifth step includes causing, via the onboard computing system and responsive to the verification, the container to open. In some embodiments, the verification signal can trigger a release of a lock.

In another aspect, embodiments include a method of safeguarding pharmaceuticals stored in a container is disclosed. The method includes a first step of receiving at a first time, at an onboard computing system for a container and from an onboard impact sensor, first data indicating the container has experienced a tamper event in which an unauthorized person attempted to use force to open the container, the container holding a payload of one or more chemical compounds. A second step includes automatically triggering, responsive to receiving the first data and via the onboard computing system, a tamper reaction including a release of a neutralizing agent that causes a degradation of the one or more chemical compounds.

In yet another aspect, embodiments include a system for secure pharmaceutical transportation that includes a processor and machine-readable media including instructions which, when executed by the processor, cause the processor to: (1) receive at a first time, at an onboard computing system for a container and from an onboard location sensor, first geodata indicating the container is within a first range of a first target property, the container holding a payload of one or more chemical compounds; (2) transition, responsive to receiving the first geodata, the container from a first state in which container access requests are blocked to a second state in which container access requests are permitted; (3) receive at a second time after the first time, at the onboard computing system, a first request for access from a first user at the first target property, the request accompanied by one or more of biometric data and a passcode; (4) verify that the first user is an authorized recipient of the payload; and (5) cause, via the onboard computing system and responsive to the verification, the container to open.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The embodiments disclosed herein may be better understood with reference to the following listed drawings and their descriptions. The components in the drawings are schematic rather than representational, and are not necessarily to scale, the emphasis of the disclosure being placed upon illustrating the purpose of implementing the systems and methods disclosed herein. Moreover, in the drawings, like reference numerals designate corresponding parts throughout the drawings.

DESCRIPTION OF EMBODIMENTS

Figure 1A:
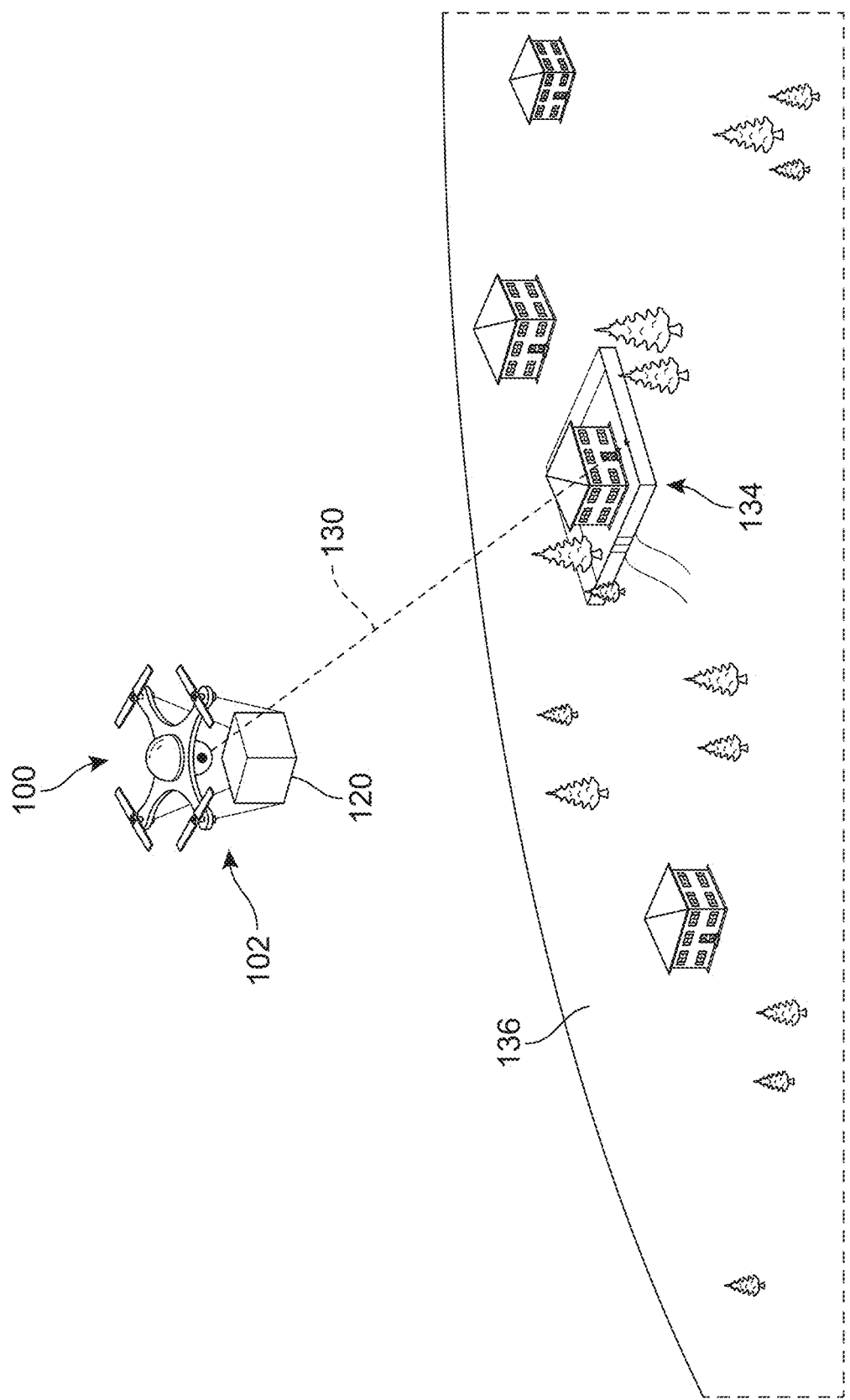
FIGS. 1A and 1B are a depiction of a container delivery of pharmaceuticals that only permits access to authorized users when the container is within range of a designated target location, according to an embodiment.

The proposed embodiments describe a system and method for use of a container or package that secures pharmaceuticals being delivered to or are otherwise in transit to an endpoint (such as a consumer or pharmaceutical retailer). Consumers are increasing relying on delivery services to obtain goods, including groceries, home goods, and electronics. Some goods require special handling that currently delivery services are unable to provide. Other goods may be targeted for theft. In the case of medicinal products, such as pharmaceuticals, both of these challenges may need to be taken into consideration. In order to ensure delivery, the proposed embodiments provide a secure container that can be sized and dimensioned for a particular volume of pharmaceuticals and readily deployable as a transportation device. It can be appreciated that in the case of many medicinal products, a typical customer may be older and benefit greatly from home delivery.

The secure container may be dropped at the consumer's home, for example via a courier, standard delivery service, or drone. In different embodiments, access to such a secure container can be facilitated by a software application ("app") or other code, to complete a safe and secure delivery. In some embodiments, the secure container may require alternate or additional authorization for access. For example, other authorization features may be implemented, including two-person approval, single use access codes, and geo-located activation. For example, access to the container may only be granted at a delivery location, after verified by onboard geo-location sensors.

In some embodiments, the container may be particularly suited to a drone-based delivery system, a transportation mechanism that is growing in popularity. However, there is currently no device for securing payloads including medicinal products when using drone-based delivery systems. In some embodiments, the drone may be programmed to wait for the customer to open the container and retrieve the payload. In another example, the drone may be programmed to drop the container at the designated location. The container may in some cases be retrieved at a later time or returned by the customer.

Furthermore, in different embodiments, the system includes a climate-controlled container. The climate-controlled container may ensure the integrity of the contents. For example, in the case of medicinal products, the products may be chilled and a maximum temperature can be ensured. The container may also or alternatively include theft prevention features. For example, as described in greater detail below, upon an unauthorized opening of the container, a reactant capable of rendering a payload (e.g., the medicinal products) inert or inactive may be released. The medicinal products may be stored in a compartment within the container, into which the reactant may be injected in the case that the container is compromised. Some non-limiting examples of a reactant that can be used may include chemicals that create heat capable of burning off active ingredients of a medicinal products, a dilutant that increases the bulk of a pharmaceutical product, or a liquid that may dissolve the payload.

As noted above, the theft of medicines generates a series of impacts that go beyond the monetary value of the stolen products. This type of crime can have severe impacts on public health, legitimate companies, and national healthcare systems. On the one hand, the stolen products are not subjected to any quality standards related to storage and transportation (e.g., maintaining an adequate temperature or avoiding contamination by other products). Thus, the individuals who use them may not effectively treat their medical needs or even cause further damage to themselves. Consequently, the theft of medicines can impact mortality rates, increase the prevalence of diseases, and decrease public trust in the healthcare system. On the other hand, it affects manufacturers, legitimate traders, and transportation companies who lose their reputation and profits due to both thefts and the associated costs of prevention, detection, and recovery. This type of crime also results in increased regulatory and enforcement expenses and higher healthcare costs, affecting national governments and healthcare systems. Moreover, the theft of medicines is often a transnational crime that not only affects the countries where the thefts occur but also those where the stolen medicines are laundered or intended for sale. Thus, it is imperative that improved systems and methods for transportation of pharmaceuticals be made available for general use. The proposed embodiments fill this critical void in secure delivery of medicines and other chemical compounds.

Figure 1B:
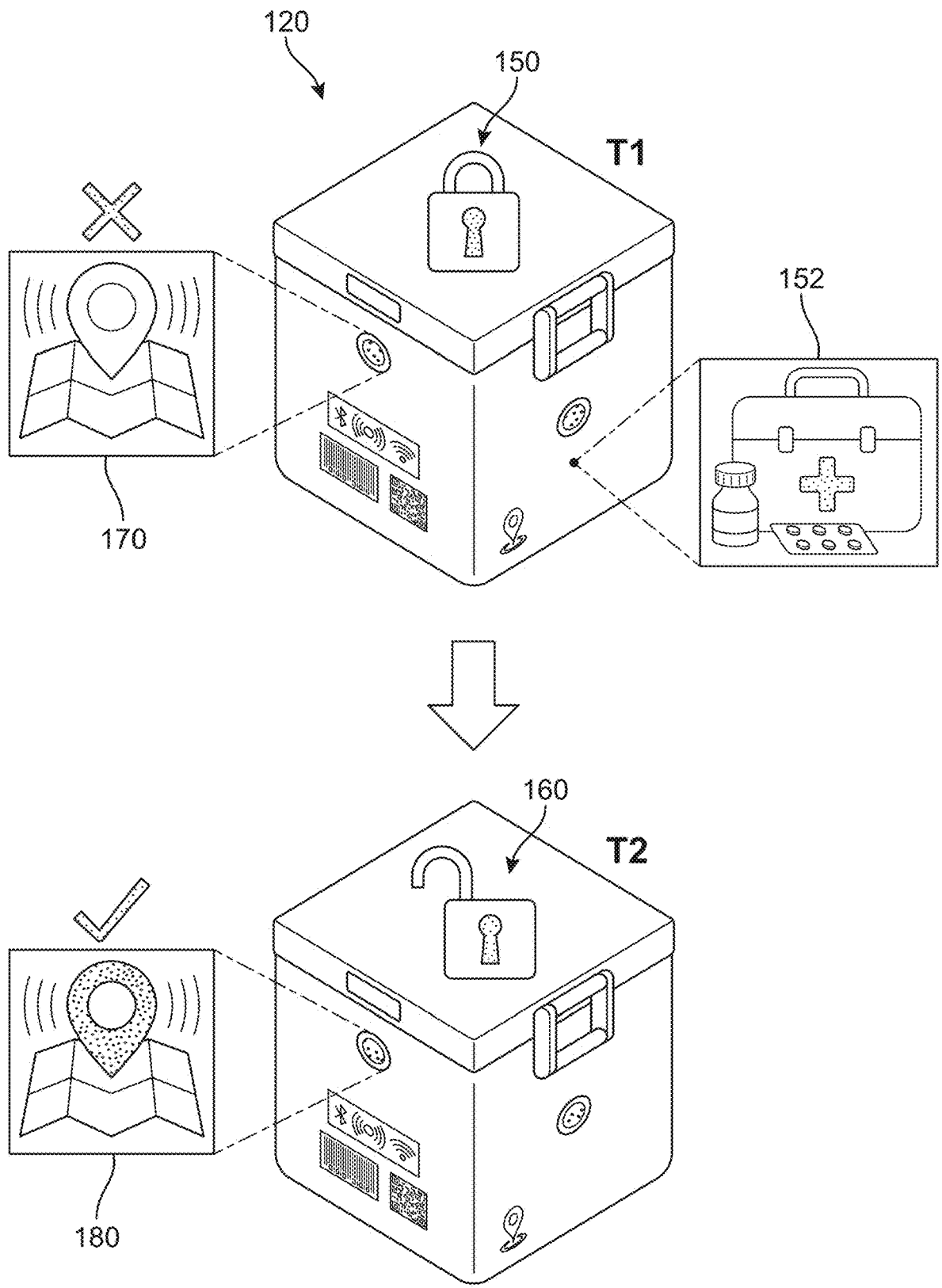

For purposes of introduction, an overview of one embodiment of the proposed systems and methods is illustrated with reference to FIGS. 1A and 1B. In FIG. 1A, a secure container ("container") 120 corresponding to the requested item is depicted as being carried by an unmanned aerial vehicle ("first UAV") 100. The first UAV 100 is shown in a first location 102 flying over a neighborhood 136 and approaching the consumer property 134. In different embodiments, the UAV can be remotely controlled or autonomously controlled.

As a general matter, a UAV navigation system can include a ground system or other remote computing system that is in communication with an onboard system. In some embodiments, the ground system includes provisions for gathering information about upcoming or pending deliveries following an order request that can be used to facilitate the drone's flight through upper airspace. For purposes of this application, upper airspace refers to the navigable airspace through which a drone may travel using GIS or GPS navigation until reaching its macro-destination. Upper airspace is typically controlled. The term lower airspace, as used in this application, refers to the airspace that must be traversed in order to move to the final micro-destination (after reaching the macro-destination).

In different embodiments, the ground system comprises a computing system with one or more processors and memory. The ground system includes provisions for communicating with various other systems (e.g., a ground communication system) as well as for processing image or other data received from UAVs. The ground system can also include a path planning module that works in conjunction with a navigation module of the UAV. The path planning module includes provisions for generating upper airspace flight path directions and guidance. The drone computing system can also include a navigation module that can further include a GPS receiver for receiving GPS information that can be used to determine a GPS location for the UAV. In addition, the navigation module can receive path instructions from a ground system and process and execute the instructions to direct the UAV to an address. The UAV may also include sensors for measuring orientation, altitude, and/or acceleration. For example, the drone can include a gyroscope, an altimeter, and an accelerometer. In some embodiments, the drone can include an altitude and heading reference system (AHRS). Using these devices, the orientation, heading, and height of the aerial vehicle can be determined. This information, when used with a GPS location for the UAV, can be used to infer the location of the UAV and its position relative to a target destination.

The UAV can include a UAV communication system for communication with the ground communication system. These communication components enable information to be transmitted between the systems via a network or signal processing. Thus, the type of communication components used in each communication system can be selected according to the type of communication channel used. In some cases, a cellular network could be used so that each communication system includes a cellular radio or other component that enables cellular communication. Using a cellular network may enable information to be exchanged while drone is in the air where Wi-Fi or other networks might be unavailable. In other cases, networks could comprise any kind of local area network and/or wide area network. In some cases, network may be a Wi-Fi network or RF network.

In different embodiments, the UAV coverage path is composed of a set of waypoints, where each waypoint represents a navigation command to the vehicle, such as take-off, change of speed or move to a specific location, and contains information about the latitude, longitude and altitude. In one embodiment, the flight paths are typically followed by implementing guidance systems such as discrete sets of waypoints that are usually generated on a remote ground station and then wirelessly relayed to the UAV's autopilot. These waypoints have all the necessary localization information to guide the vehicle. More specifically, a waypoint at a minimum refers to data that includes a set of coordinates that identify a specific point in physical space. A ground system equipped with waypoint technology typically utilizes Global Positioning System (GPS) and Global Navigation Satellite System (GLONASS) to create waypoints. As long as the UAV is able to connect with at least four GPS or GLONASS, precise three-dimensional positioning (longitude, latitude, altitude) can be determined. Thus, waypoints can be used to describe the flight path from the drone starting point to a macro-destination. In some embodiments, a waypoint may further include instructions for the flight path between two sets of coordinates and the maneuvers that should be performed by the UAV between each set of coordinates. Furthermore, the position of the waypoint also determines the arrival time accuracy.

In the example depicted in FIG. 1A, the first UAV 100 can be understood to be almost within range of the address designated as its destination for delivery of the secure container 120. Moving now to FIG. 1B, one embodiment of a security mechanism that can be implemented by the secure container 120 is illustrated. At a first time T1 shown on the top of the page, while the secure container 120 is still outside of a predefined range (e.g., 0.25 miles, or some other preset distance) of the container delivery destination, onboard location sensors determine that the secure container 120, carrying a first payload 152 of pharmaceuticals, is not yet near the destination (here shown as consumer property 134) in a first location assessment 170 and so the container remains in a secured (fully locked) state 150. However, as the first UAV 100 continues it journey and moves within the preset range of the destination, the location sensors determine, in a second location assessment 180, that the container is now close enough to the consumer property 134 to trigger a release of at least a first lock mechanism at a second time T2, thereby automatically transitioning the secure container 120 from the secured state 150 to a released (unlocked state) 160. Such a process ensures that only when the container is at or very close to the location that was designated as the drop site will access to the contents within be permitted.

It should be understood that although arrival at or near the container's target destination can trigger the locked to unlocked response in the container 120, in some embodiments, additional security mechanisms may still be active and require specific tokens or codes to actually open or unseal the container 120. For example, if the customer takes possession of the container 120 outside of the target destination (e.g., 5 blocks away), they may know the code to unlock the container 120, or be able to present some token or code, but the container 120 will remain closed/sealed because their current location does not have authorization for opening the container. Similarly, once the container 120 arrives at the target destination, now in a released state, the consumer cannot simply open the container. They must now further provide their code, token, or other security factor to cause the container to be fully unsealed and allow access to the interior where the contents are stored. Thus, the location data can serve as one security factor and the user's own interaction with the container can serve as another security factor, and in some cases multiple additional factors may be required (e.g., scannable tokens, QR or other codes, biometric data, passwords, etc.), allowing the container to provide a multi-layered gatekeeping mechanism that can be used to stringently verify the user's authorization to access and receive the container's payload.

Figure 2:
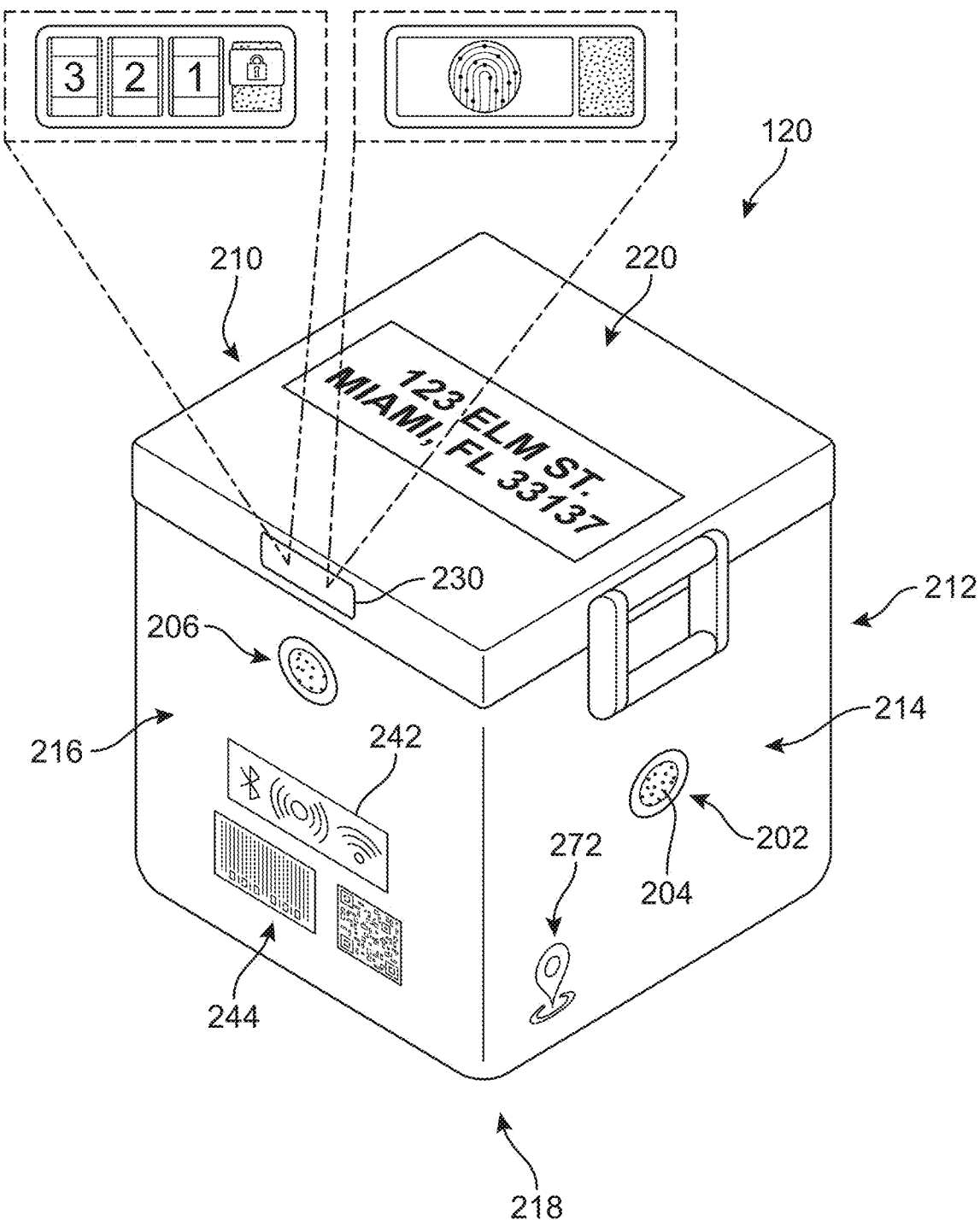
FIGS. 2 and 3 depict one example of a secure container for safe delivery of pharmaceuticals, according to an embodiment.
Figure 3:
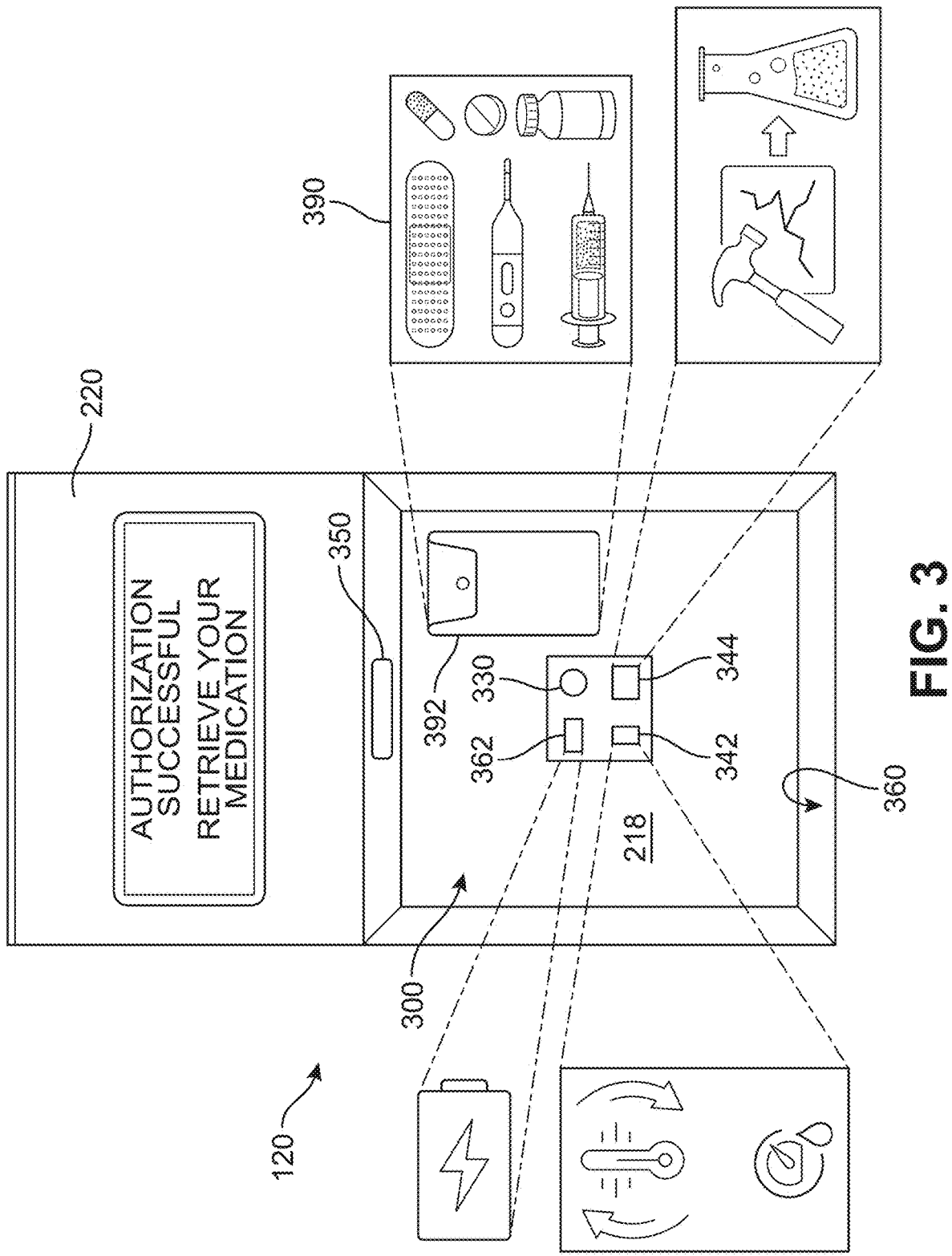

Referring now to FIGS. 2 and 3, an embodiment of the container 120 is depicted in isolation for purposes of clarity. FIG. 2 presents an isometric sealed view of container 120 (secured/closed/locked state), as it might appear at the time of shipping and delivery. FIG. 3 presents a top-down view of the container 120 when opened (in cases in which a lid 220 is attached by a hinge or other movable connecting mechanism) as an opened, unlocked, unsecured, or released state.

Beginning with the closed state shown in FIG. 2, the container 120 can be seen to include a first sidewall 210, a second sidewall 212, a third sidewall 214, and a fourth sidewall 216 that together provide a substantially continuous rectangular perimeter, and form a box or enclosed package along with a base 218. As shown in FIGS. 2 and 3, in different embodiments, the container 120 includes a plurality of embedded components. In FIG. 2, for purposes of simplicity, various symbolic panels and components are depicted on an exterior surface of the container, including communications module 242 and location tracker device 272. Furthermore, in some embodiments, the container 120 can include identifier markings 244 such as a bar code or QR code (or other identifier such as alphanumeric characters) that can be scanned or otherwise inputted into the associated computing system for tracking and assignment of the container to and/or from a destination. In some embodiments, containers may include identification features disposed on an exterior surface. The identification features may allow a computer system to identify the package. Some examples of an identification mark can include; a barcode, alphanumerical code, label, icon, or quick response (QR) code. In other embodiments, any other kind of identifier or indicia could be used with the container.

In addition, in this example, multiple cameras 202 represented here by first camera 204 and a second camera 206, are also installed along an exterior surface of the container 120. In other embodiments, fewer or additional cameras 202 may be installed, positioned such that a wide-angle lens of the camera is aligned with an aperture formed in the container, and a field of view is as wide as possible. Thus, it should be appreciated that each sidewall can include no camera, one camera, or two or more cameras, where each cameras has a corresponding opening in the external surface of the container to ensure an unobstructed field of view for the camera's lens. The cameras can be positioned at each corner of a sidewall, for example, or near the top and bottom of each sidewall. In some embodiments, one or more cameras can be installed against the base 218 to allow for image capture of the ground below. In some embodiments, cameras may be installed to face the interior of the container to allow for images of the contents to be recorded.

In some embodiments, the cameras are standard digital cameras, while in other embodiments, the cameras may also be configured to collect night-vision data in response to low lighting conditions. In some embodiments, cameras 202 can collect image data of the environment surround the container 120. The image data can be collected continuously, at periodic intervals, when a person is detected within a specific range using image recognition techniques, or in response to specific trigger events such as abrupt acceleration or drops or attempts to access the interior of the box. In some embodiments, the cameras 202 can be concealed, so that they are difficult to discern from the outside. In other examples, the cameras can be overt, and there may be signage on the exterior of the container 120 that warns persons that they may be recorded as they come in proximity or a prespecified range of the container 120. In some embodiments, consumers who place orders that will use these containers will be made aware of the possibility of recording as part of the security of the delivery, and can be required to provide consent to their images being recorded. In some embodiments, the image data can be transmitted back to a central server over a network, particularly in cases where a potential unauthorized access attempt is detected. In one example, an associated payload monitoring service can receive alerts when the container detects that it is being handled by a human. Thus, the security of the payload can be further enhanced by tracking the interactions of the container 120 with any persons.

In different embodiments, the containers described herein may include various mechanisms and systems for accessing and/or securing the components or other contents stored in its interior. A secured access system 230 can be configured to communicate and/or respond to, for example, signals emitted by near field communication (NFC) technology via a proximity sensor, for example, or an input mechanism (e.g., an interactive display or keypad) for receiving input from a user to verify his or her identity or authority to access the container, by, for example, entering a PIN or a VIP code. In some embodiments, an interactive display may issue these instructions visibly on display. A VIP code is a code-often a numeric code—that is transmitted to a device held or viewed by the user and that is only valid for a short period, such as 30 seconds or a few minutes. It may alternatively issue these instructions audibly via a speaker incorporated into the container housing. The user's identity may also or alternatively be verified by biometric scanner, which could include, for example, using facial recognition based upon the user's facial features, voice recognition based upon a voiceprint of the user, a retinal scan and/or fingerprint identification, with biometric reference records for consumers being collected and stored at a time prior to the delivery. In some embodiments, as shown in FIG. 2, a physical/touch-based locking and unlocking mechanism such as a fingerprint scanner and/or a keypad may be included to allow for secure access to the container contents.

In addition, as noted above, some embodiments may include provisions for tracking or otherwise locating or determining a route of the container 120. In some embodiments, a container could be provided with location tracking device 272 beacon (or tracking device), such as tracking beacon. Different kinds of tracking beacons could be used, including blue-tooth enabled tracking beacons, Wi-Fi enabled tracking beacons, cellular enabled tracking beacons, GPS enabled tracking beacons or any other kinds of tracking beacons. Generally, the type of tracking beacon used may be selected to optimize the range of tracking and the power needs of the beacon. For example, Bluetooth enabled beacons may have low power consumption but may only be detectable in a limited range. Various kinds of GPS enabled tracking systems may facilitate tracking over a longer range but may consume significant power. In some embodiments, a tracking beacon could be incorporated into the interior void/chamber of the container or integrated or attached to a surface of its housing.

It can be appreciated that the GPS device installed in the container 120 can be configured to generate location data ("geodata") corresponding to the current location of the container 120. This geodata, which can be produced in real- or near-real-time, is received by an onboard computing system of the container 120 and used to determine whether the container has come into a particular range of the target property. For example, if the target property is associated with a first set of coordinates, the onboard computing system can determine if the current geodata places the package within a preset range ("vicinity") of the target property. In some embodiments, once the onboard computing system verifies that the container is at or around the correct location, an activation event is logged, which causes a control signal that can activate the cameras and other sensor devices installed in the container if they were not previously active. In other words, in some embodiments, image and other sensor data for the external environment around the container can be regulated to prevent (a) a continuous drain on the onboard battery, (b) undesirable intrusions of privacy (e.g., in the delivery person's personal space), and (c) to minimize the processing power and storage capacity required by the container's operations.

After activation, the computing system can determine a deactivation event has occurred, for example when the container has been moved outside of the specified vicinity of the target property before being opened by the consumer. Thus, geodata-along with the location data provided for the target property—can be used by the computing system to cause both the activation and deactivation of security mechanisms, devices and/or components installed onboard. In different embodiments, the "vicinity" or range that can be set will typically include a boundary surrounding the target property and its associated structures, and in some cases, be extended further by some distance (e.g., 10-50 feet, 0.1 miles, 0.5 miles) to ensure timely release of any locks and activation of onboard sensors.

In some embodiments, the container 120 includes a wireless communications module for receiving and transmitting data from a processor unit in the container 120. While in some embodiments the communications module can directly communicate with a remote server via a cellular network, in other embodiments, the communications module is configured to detect nearby Wi-Fi, NFC, or Bluetooth networks and initiate a connection. This connection is then used to transfer data back to the remote server. In some cases, the container 120 could communicate directly with an application ("app") associated with the consumer (for example, using Bluetooth or Near Field Communication) when the consumer is seeking access to the interior of the container (e.g., see FIG. 5).

It should be understood that embodiments are not limited to the particular size and shape of container 120. In other embodiments, other types or styles or geometric shapes of packages could be used. For example, a container can comprise any type of package, such as a bag, hard shell or soft shell sided container, elongated/rectangular box (rather than a cube), a parcel, or other item such as shoulder bag containers, hand-held containers, duffle bag containers, rolling containers, compactable containers, as well as others. Thus, any protective housing that can be shipped and securely hold the contents (pharmaceuticals, electronics, sensors, battery, and computing system) can be used.

Turning now to FIG. 3, for purposes of clarity to the reader, the container 120 is presented in a top-down schematic view. In this drawing, the lid 220 has been pulled open from the box to reveal interior chamber 300, which is bounded by interior surface 360 of the container's walls. Secured within the chamber 300 is a computing system 350. Although the computing system 350 is shown as attached or mounted on interior surface 360 of the walls, in other embodiments, computing system 350 can be disposed anywhere within the chamber 300, including embedded inside of the walls, or along base 218. It should be understood that the term "computer system" refers to the computing resources of a single computer, the partial computing resources of a single computer, a plurality of computers communicating with one another, or a network of remote servers. In one embodiment, computer system 350 includes at least one server having at least one processor. In this example, computing system 350 includes at least a processor and memory, and a controller.

In different embodiments, the computing system 350 is connected to one or more sensor devices ("sensors") 330 arranged in different locations within the chamber 300 or along the surfaces of the walls of the container 120. Some non-limiting examples of such sensors include (a) Smoke, Gas and Alcohol (and/or other chemicals) sensors; (b) Temperature sensors; (c) Pressure sensors; (d) Cameras and other image and/or light sensors; (e) Smoke/Flame sensors; (f) Moisture/Humidity sensors; (g) Electrostatic sensors; (h) Audio sensors and other sound/volume sensors (e.g., microphones); (i) Motion/speed sensors; (j) Gyroscopes; (k) Accelerometers; (l) Wind Speed sensors; (m) Proximity sensors; and (n) Infrared and Heat sensors. In addition, in some embodiments, sensors 330 can include ultrasonic sensors, touch sensors, aerosol characterization sensors, magnetometers, color sensors, tilt sensors, and flow and level sensors. Thus, in different embodiments, sensor devices 330 may collect data regarding location, speed, and direction of the container 120 and/or of objects near the container. In cases in which temperature sensors are included, the system can be configured to also monitor the temperatures of nearby structures, or infrared data can be used to help determine a likely stability level for a structure or potential internal damage.

Figure 7:
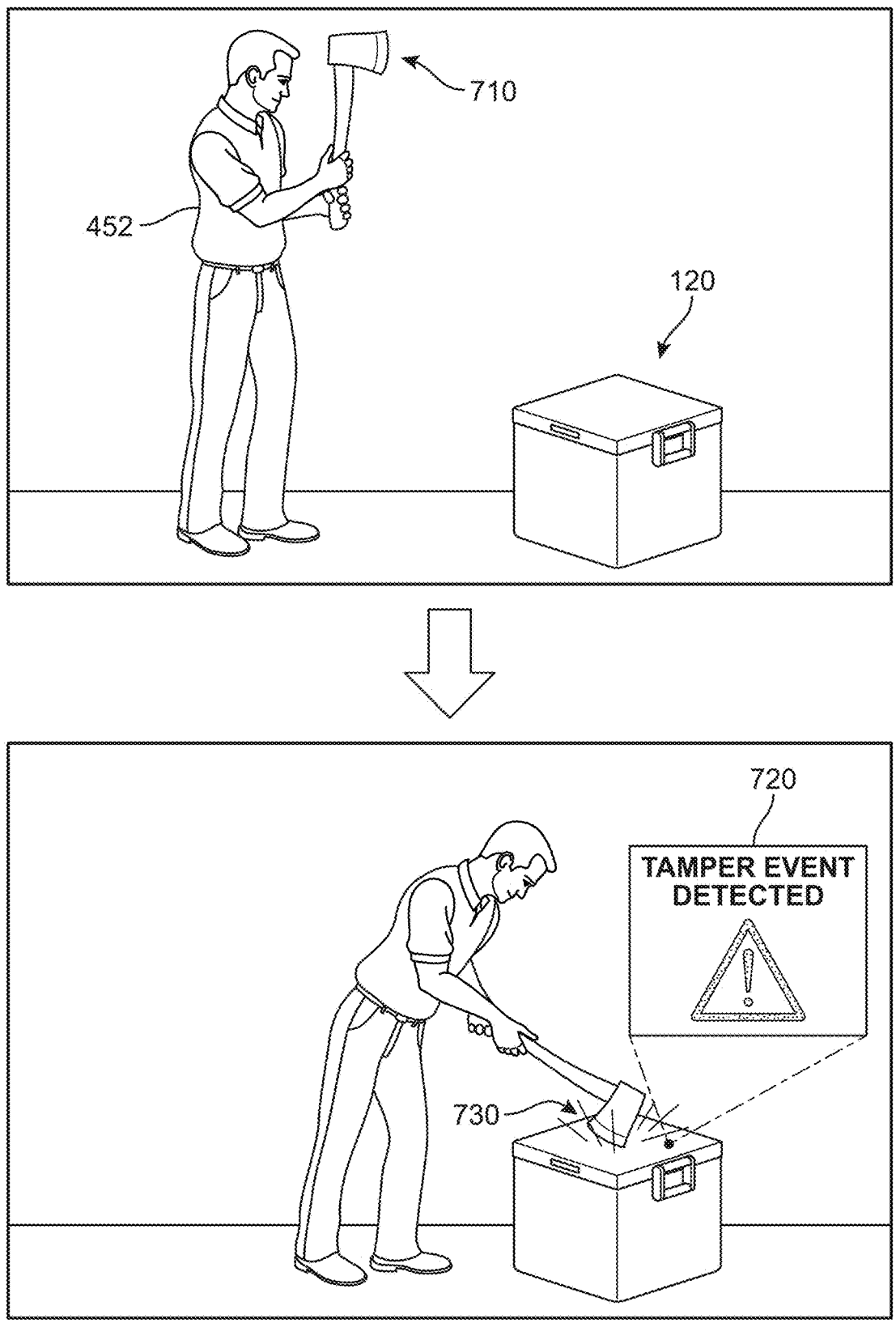
FIG. 7 shows an example of an unauthorized person applying force in an attempt to open the container, according to an embodiment.

In some cases, sensors can refer to one or more of a stationary internet of things (IoT) device(s) ("smart sensors") that communicate over a network. Smart sensors could comprise any of a variety of different IoT devices and other smart devices that may include one or more sensors. Supplemental data from such smart sensors can be received by the system and used to determine property information with more precision. In different embodiments, data collected by sensor devices 330 can be used by the computing system 350 to identify when tampering has occurred and/or whether there is some environmental data that would constitute a trigger for neutralization of the pharmaceuticals, as will be discussed further in FIGS. 7, 8, and 9 below.

In different embodiments, container 120 can include a power source, such as onboard battery 362. The onboard battery 362 may be charged by connection of an electrical source to an outlet and/or a solar panel (not shown) that may be installed along an outer wall of the container. In some embodiments, the onboard battery 362 may be any kind of battery known in the art. For example, onboard battery 362 could be a rechargeable lithium-ion battery. In embodiments where onboard battery 362 is rechargeable, power for recharging it could be supplied by a solar panel. In other embodiments, a non-rechargeable battery could be used. Onboard battery 362 may be used to power a variety of different items, including cameras 202 (see FIG. 2), onboard computing system 350, sensor devices 330, communications module, and/or a location tracking device. If an electronic locking system is used, such as a fingerprint reader or display, the battery 362 could also be used to power such systems. The payload management facility or other pharmaceutical delivery center can store the container 120 in a charging mode until the container is being used for transportation to help ensure the power supply remains full prior to any delivery event. Thus, in some embodiments, chamber 300 can include wiring (not shown) that can enable power and data transfer between the container's components and external data/power sources In some embodiments, the container 120 includes provisions for ensuring the components stored within are protected from external forces and elements. For example, some embodiments can include provisions that protect the contents of container in high temperature or fire conditions. In one embodiment, some or all exterior or outermost (exposed) portions of the container 120 can include a flame-resistant layer or coating. In some embodiments, flame-resistant layers may also be waterproof, such that the interior chamber 300 remains dry when the container is immersed in liquid. Some embodiments can include provisions to increase the buoyancy of the container. In some embodiments, some or all portions of outer walls are buoyant or inflate upon contact with, submersion, and/or immersion in water.

For purposes of this example, a payload 390 is also depicted, secured within chamber 300. In some embodiments, the payload 390 may be stored within a permeable receptacle 392 or pouch or some other material. In different embodiments, payload 390 can include pharmaceuticals and related accoutrements. For example, payload 390 may include one or more of medical devices, syringes, liquid or solid chemical compounds (e.g., medications), pills, etc. In general, pharmaceuticals must be stored, handled, and shipped at specific temperature ranges and within a specific time span, or they may be rendered ineffective, or even harmful and possibly even life-threatening to the people who consume them.

In FIG. 3, an environmental regulation unit 342 is represented schematically, with the understanding that the environmental regulation unit 342 includes a controller that can respond automatically to variations in temperature and moisture, along with refrigeration and dehumidifier/humidifier devices. Such an apparatus is necessary because many pharmaceuticals are dependent on a "cold chain" (uninterrupted refrigeration) or "temperature-controlled" conditions. The spectrum that must be maintained ranges from ambient, or controlled room temperature (20° C. to 25° C.), to refrigerated (2° C. to 8° C.), to cryogenic (below 0° C. to as low as −150° C.). Many pharmaceuticals also react to humidity, light, vibration, and shocks. In one example, the key for radioactive therapeutic agents is based on its half-life, or the time it takes an isotope's radioactivity to decrease by half of its original value, thereby losing its potency. For some drugs, the half-life can be a handful of days. Thus, drugs can be susceptible to damage by exposure to the elements, cold air or hot breezes, cold and hot times of day, and intensity of sunlight. In addition, freezing some liquid drugs, such as insulins, can compromise their integrity if they're then quickly thawed. Freezing also can negatively impact solid forms of some drugs.

Furthermore, with an increasing complexity in drug composition, incorporating large-molecule biologics, many more types and numbers of drugs are sensitive to temperature or time than previously. In order to protect and preserve the quality and efficacy of the payload, in different embodiments, the environmental regulation unit 342 includes provisions for providing either or both of active and passive temperature control, as well as provisions for real-time monitoring of temperature and humidity within the container 120. In general, active temperature regulation relies on an onboard thermostatic-controlled energy source, such as a cooling or warming system (e.g., autonomous refrigeration, forced-air resistance heating film, compressor, fans, refrigerant, controls, battery, etc.) such that the outside temperature generally will not affect products stored within the container. On the other hand, while external conditions can affect passive packaging, which uses conventional packaging combined with wet ice, gel packs, dry ice, advanced phase-change materials (PCMs), or liquid nitrogen ($LN_2$), depending on the temperature control needed, but for short trips or in areas of moderate climates, such techniques may be preferable from a cost standpoint.

In different embodiments, the container 120 can include provisions for additional security measures beyond the seals and locks that keep the container sealed until authorized users provide some factors or tokens to open the container. For example, in FIG. 3, a tamper response module 344 is schematically depicted. The tamper response module 344 can include elements, sensors, components, and controllers that can (a) determine if sensor data indicates a tamper event (e.g., an unauthorized attempt to open or otherwise damage the container) and (b) trigger, in response to the tamper event, a neutralization mechanism that causes the pharmaceuticals currently held in the chamber 300 to become inert or otherwise ineffective. Additional details regarding this mechanism will be provided with reference to FIGS. 7-9 below.

Figure 4A:
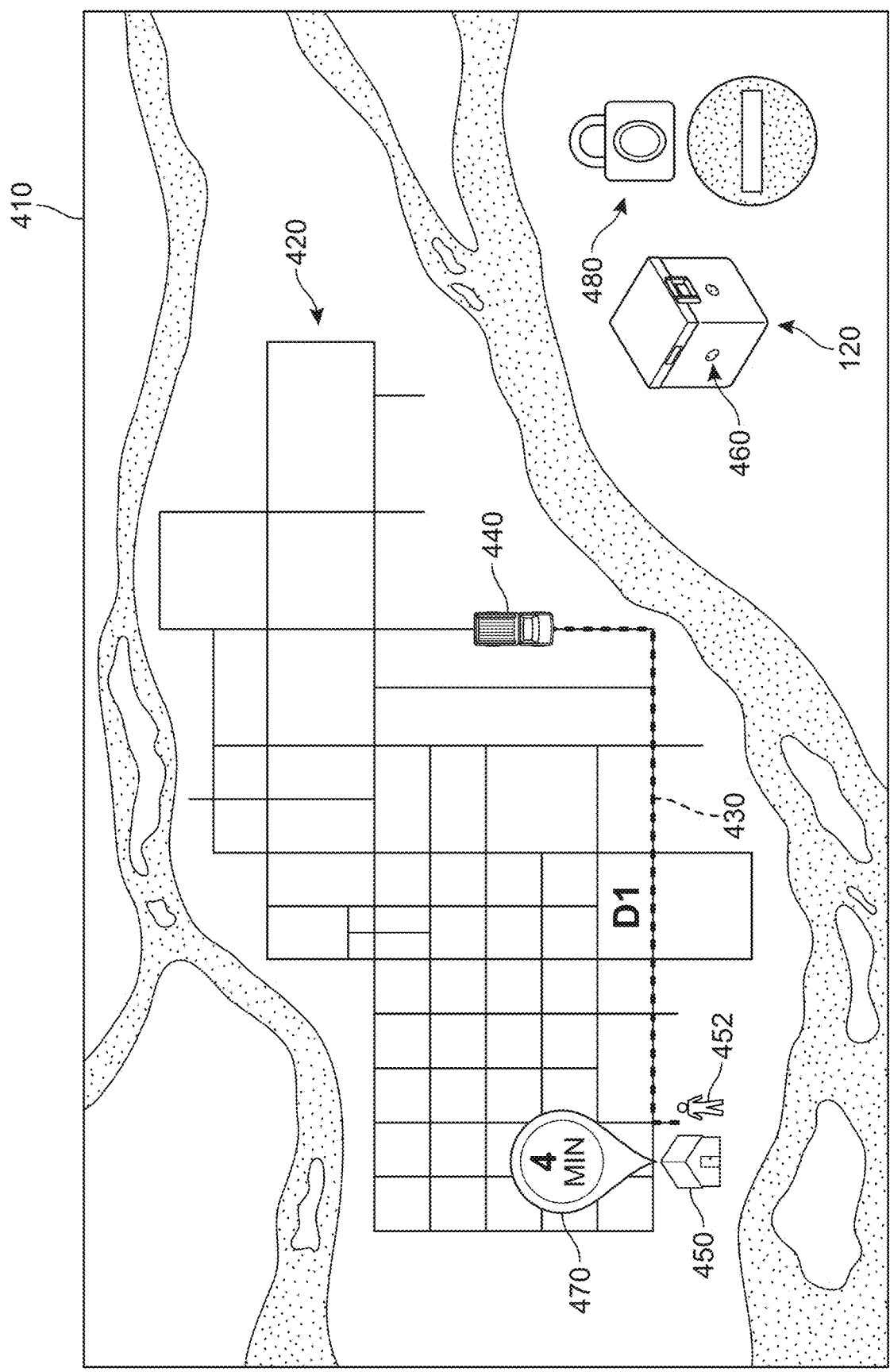
FIGS. 4A, 4B, and 4C are a sequence showing a transition of a container from a first state to a second state based on its location data, according to an embodiment.
Figure 4B:
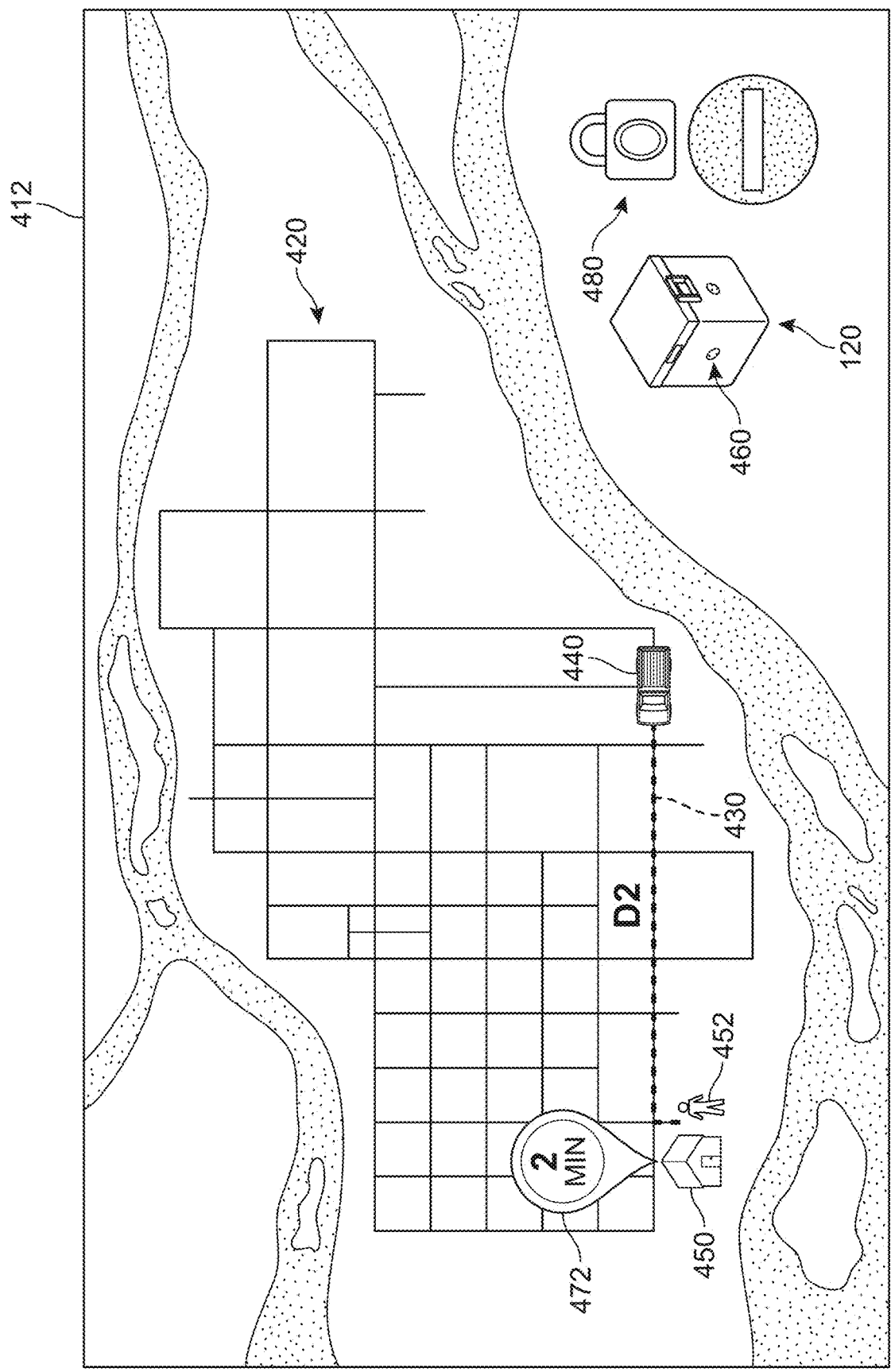
Figure 4C:
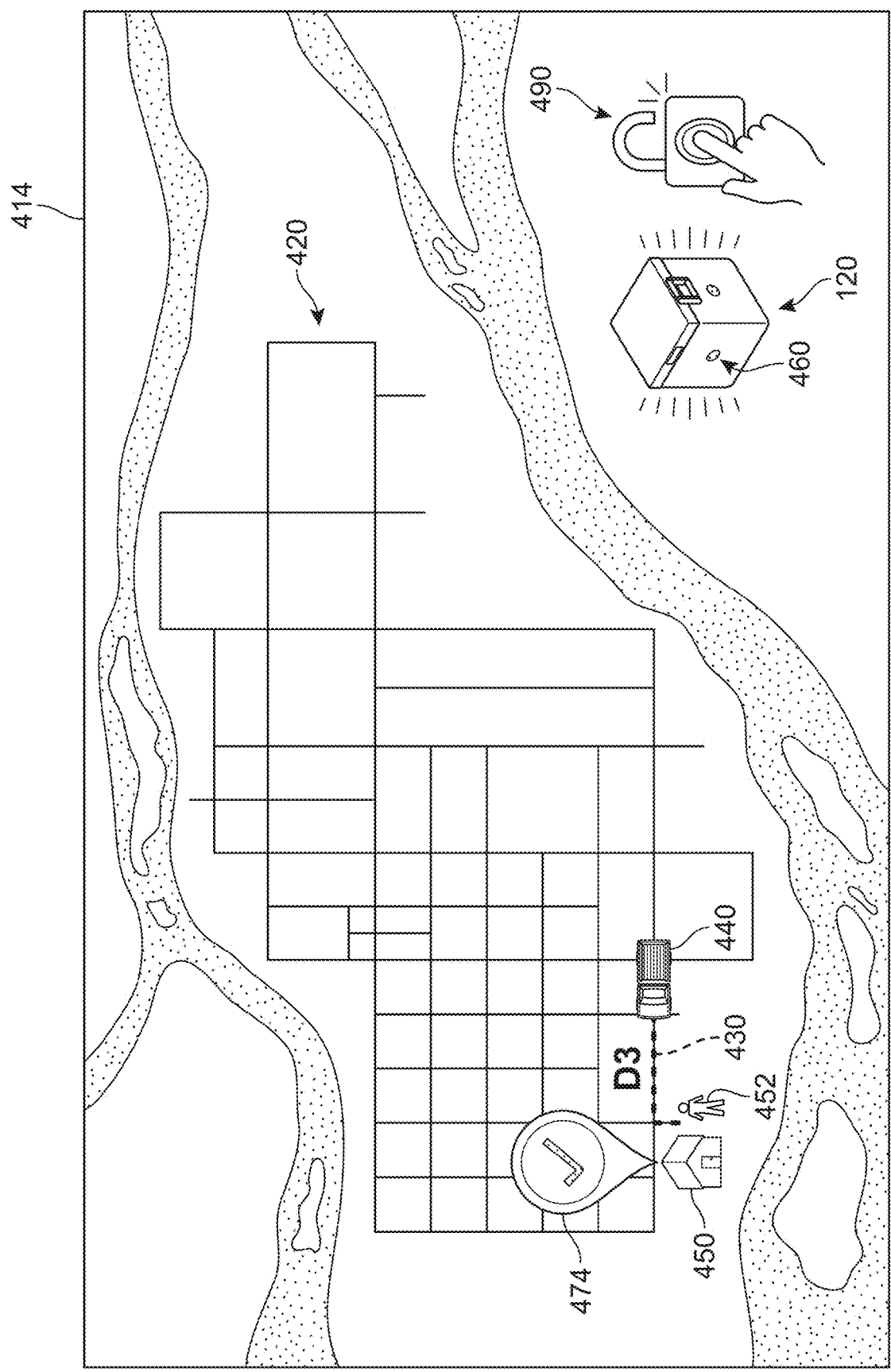

As noted earlier, in different embodiments, as the container 120 is in transit (e.g., by a vehicle such as a plane, car, truck, ship, drone, etc.), its location can be monitored in a continuous or semi-continuous manner, for example via the onboard location tracker. FIGS. 4A, 4B, and 4C are a sequence of drawings depicting the delivery and preliminary lock-permission process for container 120. A first view 410 of a city grid 420 at a first time is shown in FIG. 4A, where a vehicle (such as delivery truck 440) in which the container 120 is loaded (and currently in a secured state 480 with respect to all locks and seals) travels toward a target property 450, associated with a recipient 452. At this time, the truck 440 is a first distance D1 from the target property 450, or about 4 minutes per a first estimate 470 generated based on container's onboard GPS tracking device 460.

In FIG. 4B, a second view 412 (at a second, subsequent time) of the city grid 420 is presented, and truck 440 is now at a second distance D2 away from the target property 450 that is less than the first distance D1. The onboard GPS tracking device 460 now generates a second estimate 472 of arrival at or near the target property 450 in approximately two minutes. In some embodiments, the onboard computing system may be triggered at this time to enter a pre-activation mode, in anticipation of the upcoming arrival event. The container 120 remains in secured state 480.

In FIG. 4C, a third view 414 (at a third, subsequent time) of the city grid 420 is presented, and truck 440 is now at a third distance D3 away from the target property 450 that is less than the second distance D2. The onboard GPS tracking device 460 now provides a third estimate 474 of arrival as having already occurred as the container has arrived at or near the target property 450. In response to this determination, the container 120 transitions from the secured state of FIGS. 7A and 7B to state 480 in which a preliminary requirement which must be satisfied before a consumer (e.g., recipient 452) can unlock the container has been detected (i.e., location proximity to the target destination). In other words, in some embodiments, the container 120 is now receptive to interactions with an authorized end-user, whereas prior to this time, the same end-user would not have been able to unlock the container, even with the correct credentials or passcode, etc.

Figure 5:
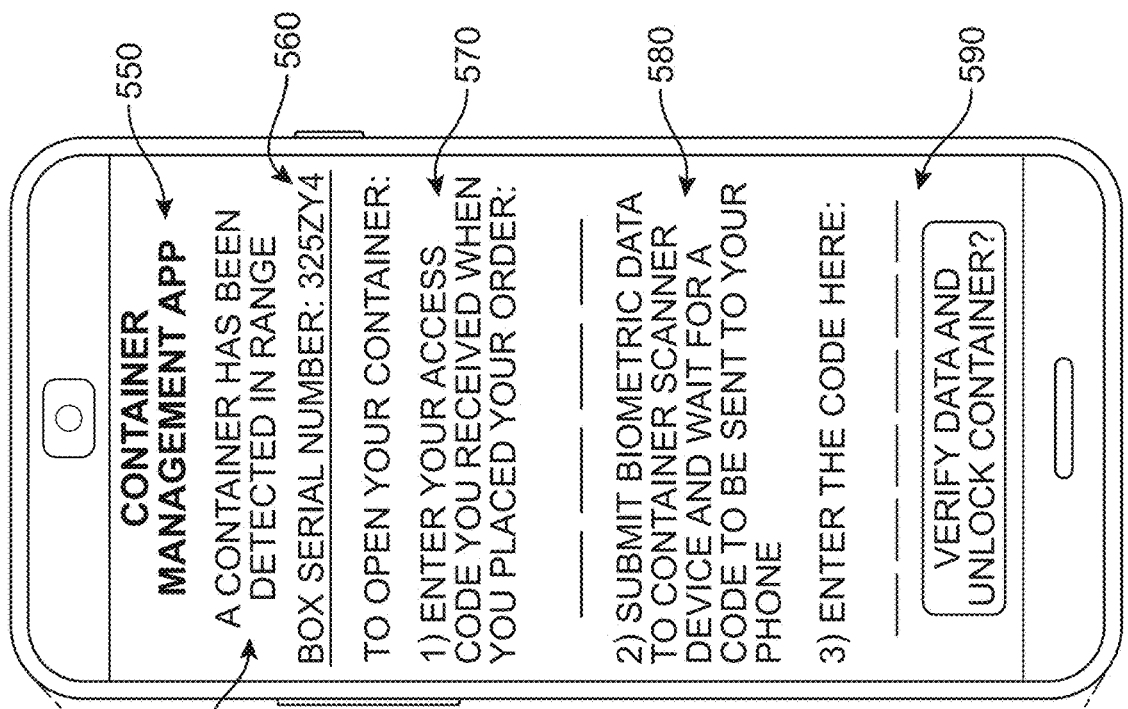
FIG. 5 is an illustration of a recipient submitting a request for access to the container via a container management software application, according to an embodiment.
Figure 5:
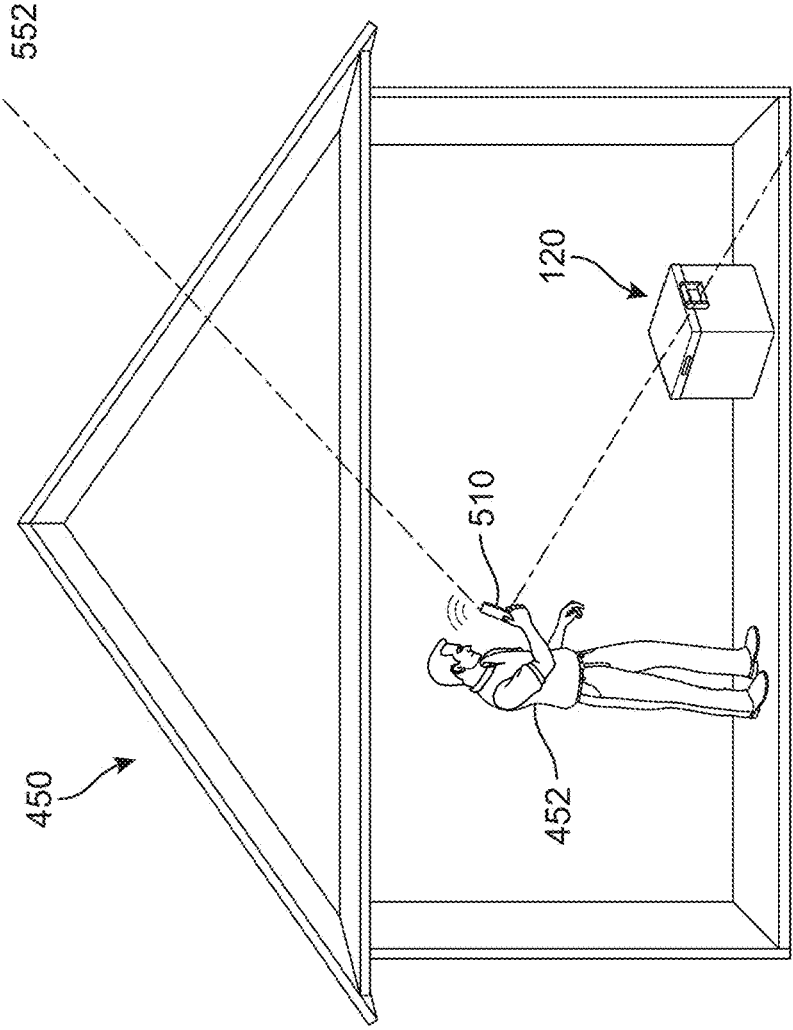

For purposes of illustration, FIG. 5 depicts an example scenario by which the recipient 452 can request access to the contents of the container 120. In FIG. 5, a schematic side view of target property 450 is shown, with the recipient 452 now being in possession of the container 120. The container 120 can be understood to have transitioned from its secure state or mode to a 'waiting' mode which allows the recipient to interact with the container 120 for purposes of authentication and access. In this case, the recipient 452 opens a container management app 550 that is accessed via a mobile device 510. The recipient 452 can in some embodiments have an account or other secure login process that allows them to access the features provided by the container management app 550. In some embodiments, the container management app 550 communicates directly with any containers that are within range of the mobile device 510.

As shown in FIG. 5, once the container management app 550 determines the mobile device 510 is near (e.g., within 10 feet) to the container 120, this proximity can automatically cause the container management app 550 to open an access portal or other user interface 552 that can guide the recipient 452 as they attempt to open the container. In this example, the user interface 552 displays information that confirms the container has been detected and identified (e.g., "A container has been detected in range/Box Serial Number 325ZY4"), which the recipient 452 can refer to when checking the identification marks on the container's exterior to ensure they have received the correct container. In addition, the user interface 552 can present instructions for opening the container 120, including a first operation 570 ("Enter your access code you received when you placed your order") that can serve as an initial layer of authentication, by requesting the recipient 452 to have knowledge of or access to their order information. Once this code has been submitted and verified, a second operation 580 ("Submit biometric data to container scanner device and wait for a code to be sent to your phone") can require both a second layer of authentication (biometric data) and a third layer of authentication (access to their registered phone number). In different embodiments, the container 120 can include a biometric data scanner, as discussed above, which can collect the data and transmit the data to the container management app 550. In other embodiments, the biometric data can be collected via the sensors of the recipient's mobile device 510. In some embodiments, the container management app 550 can perform verification of the user's biometric data locally, while in other embodiments, the container management app 550 sends the biometric data to a remote server over a network to perform the verification. Finally, in a third operation 590 ("Enter the code here:"), the correct code as text or in-app messaged to the mobile device 510 is requested.

Figure 6:
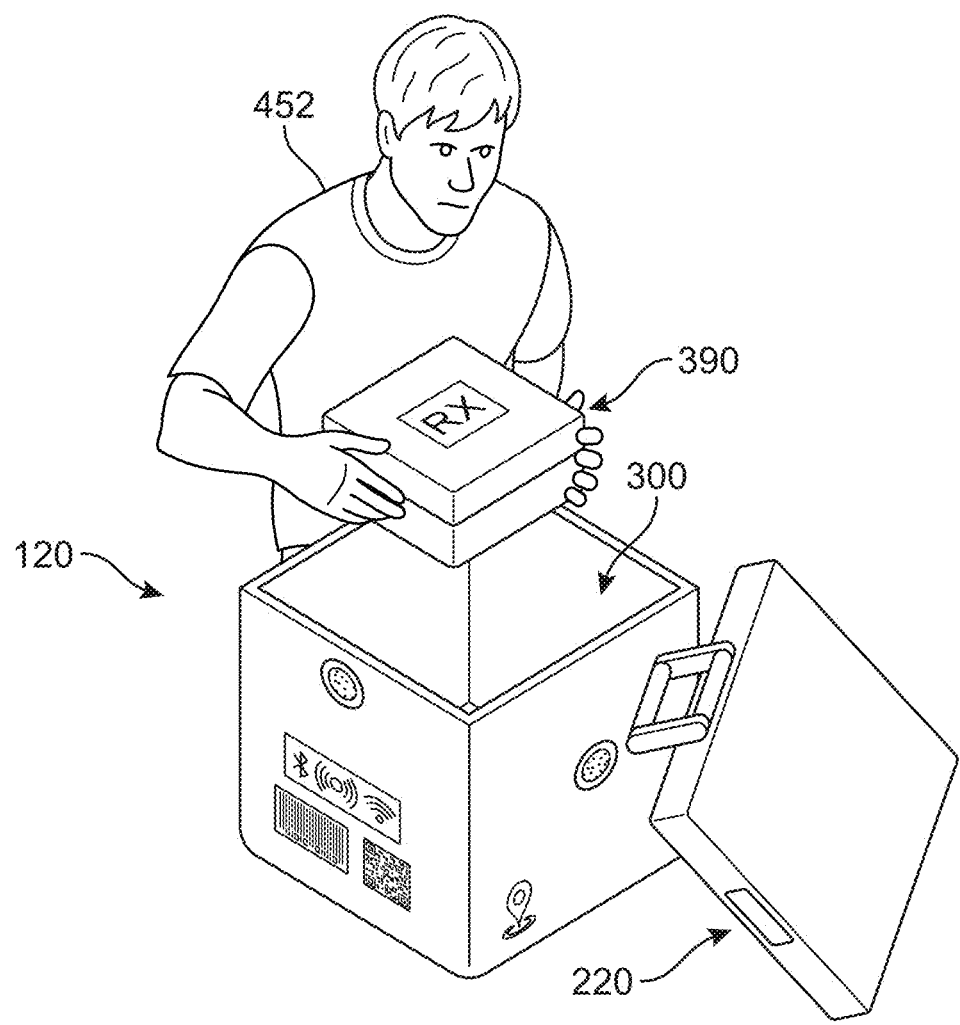
FIG. 6 is a depiction of the recipient removing their pharmaceutical payload from the container following authentication, according to an embodiment.

In some embodiments, once the recipient 452 has provided the required credentials or factors, the container management app 550 can generate and transmit a release control signal that causes the container 120 to become unlocked or opened. One example of this response is presented in FIG. 6, where recipient 452 is shown having removed lid 220 and opened the container 120 to access payload 390 held within chamber 300. Thus, in different embodiments, multiple layers of authentication can be required to maximize the container's security.

As a general matter, in different embodiments, container management app ("app") 550 can be accessed via any user computing device configured for connection to a network. The app 550 can provide an interface presented on the display of the user's computing device offering content via native controls included in the interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In different embodiments, devices and components such as the mobile device associated with the recipient, the container, the remote server, the drone's onboard computing system, etc. can communicate with each other and with other components in their environment over one or more networks. The network may comprise any number of electronic devices and use any number of communication protocols to facilitate data communications within the network. One having skill in the art would appreciate that the network may include a variety of internal and/or external networks of various types implementing various data communications technologies. The communication over the network may be performed in accordance with various communication protocols such as Transmission Control Protocol and Internet Protocol (TCP/IP), User Datagram Protocol (UDP), and IEEE communication protocols. The network can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network may include a physical and/or logical architecture defined by firewalls, proxy servers, routers, switches, or similar features that implement various levels of security and my function as logical gateways or boundaries.

As introduced earlier, in different embodiments, the container 120 can include provisions for safeguarding its contents from access by unauthorized persons (e.g., theft) and discouraging any such attempts. Moving to FIG. 7, an example scenario in which an unauthorized person 752 tries to open the container 120 is depicted. In this case, the geolocation data may have been verified (e.g., the container has arrived at the target destination), or the container may be elsewhere. Regardless, the unauthorized person 752 can be understood to represent someone for whom the payload was not intended. For this example, in the upper panel of the drawing, the unauthorized person 752 approaches the container 120 with an axe 710 or other blunt-force tool with the goal of forcing the container open. As shown in the lower panel, he strikes the container 120 with a force that could potentially destabilize the container's integrity. This process may occur multiple times. Each time, onboard sensors for container 120 register the impact (e.g., shock/impact sensors, such as inertial sensors or accelerometer), and in response, generate a tamper alert signal 720.

Figure 8:
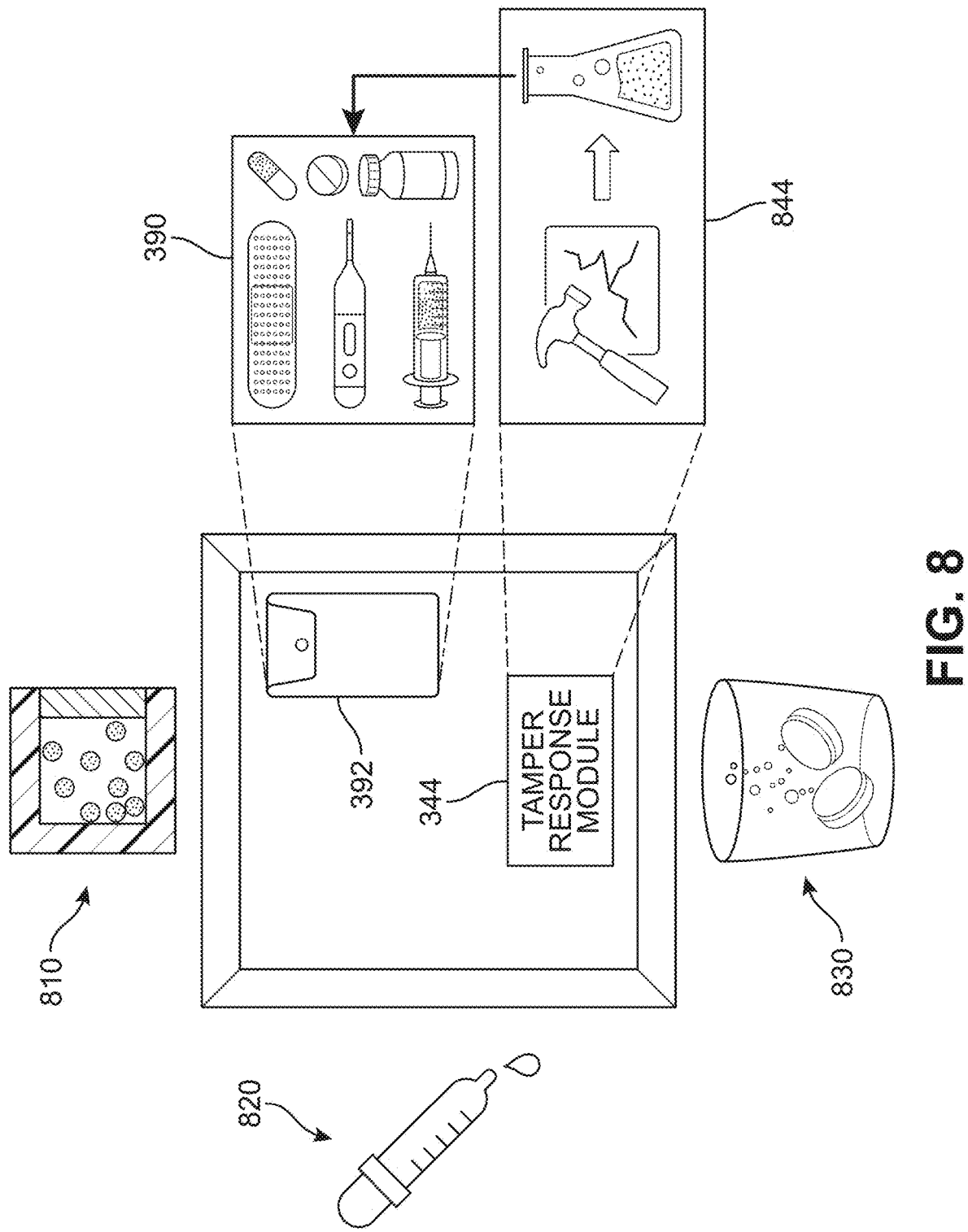
FIGS. 8 and 9 are schematic flow diagrams showing the process by which a tamper response module detects tamper event and automatically triggers a neutralization reaction, according to an embodiment.
Figure 9:
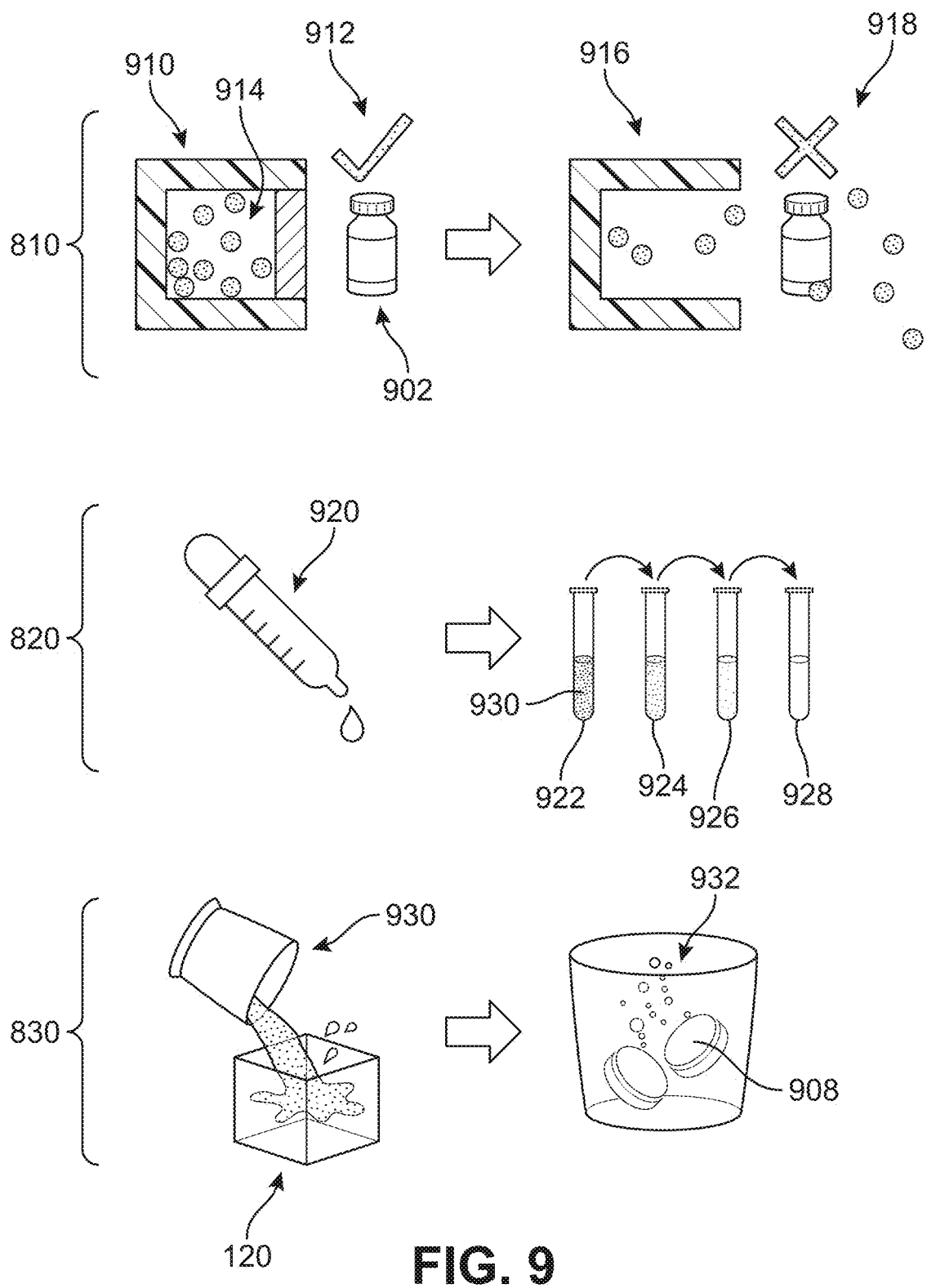

In some embodiments, this tamper alert signal 720 can cause one or more protective responses within the container 120. Turning now to FIGS. 8 and 9, this process is depicted in a schematic diagram including a top-down view of container 120. In different embodiments, tamper response module 344 can receive data from the onboard sensors and determine that unauthorized attempt(s) 844 to force open the container have occurred or are occurring. In response, one or more specific reactions can be triggered that make the payload 390 undesirable to a potential thief, including a first reaction 810, a second reaction 820, and a third reaction 830. It can be appreciated that the reaction that is triggered can be selected based on the type of payload that is currently held by the container 120. In some embodiments, each neutralizing reactant described can be held in a secure receptacle that includes an electro-mechanical release that can be switched in response to a signal from the trigger response module.

More specifically, in FIG. 9, it can be seen that in cases where the payload 390 includes pharmaceuticals that can be neutralized by exposure to a gaseous substance, the first reaction 810 may be appropriate. As shown in the top panel of FIG. 9, molecules of a first gas 914 is held in an airtight enclosure 910. Although shown outside of a medicine bottle 902 for purposes of illustration, it can be understood that the chemical compound inside of the bottle 902 is in communication with the enclosure 910. At this time, the chemical compound is in a potent condition 912. However, when the tamper trigger is executed, the enclosure 910 is unsealed and the first gas 914 is released in a direction and location that comes into contact with the chemical compound and/or the environment directly around the chemical compound, causing a chemical reaction that neutralizes or degrades the chemical compound so that it loses its potency and enters an inert condition 918. The chemical compound is no longer effective, and therefore has no value to a would-be thief.

In different embodiments, the second operation 820 may be employed, whereby, in response to a tamper trigger, a liquid mixture 920 can be released within the container directly into the storage device in which a given pharmaceutical liquid 906 is held. The presence of this outside liquid mixture 920 causes the pharmaceutical liquid 906 to lose its effectiveness, transitioning from a potent formulation 922, to a decreased potency formulation 924, to a minimal potency formulation 926, and then to a completely degraded formulation 928. The pharmaceutical liquid 906 is no longer effective, and therefore has no value to a would-be thief.

Finally, the third operation 830 can also be triggered in response to a tamper event. In this case, a receptacle holding a neutralizing agent 930 can be dumped or released into the container's interior, drenching the payload and any pharmaceuticals in such a way so that any drugs 908 become dissolved and/or are in a reduced concentration, losing their effectiveness 932. The drugs 908 are no longer effective, and therefore have no value to a would-be thief.

Figure 10:
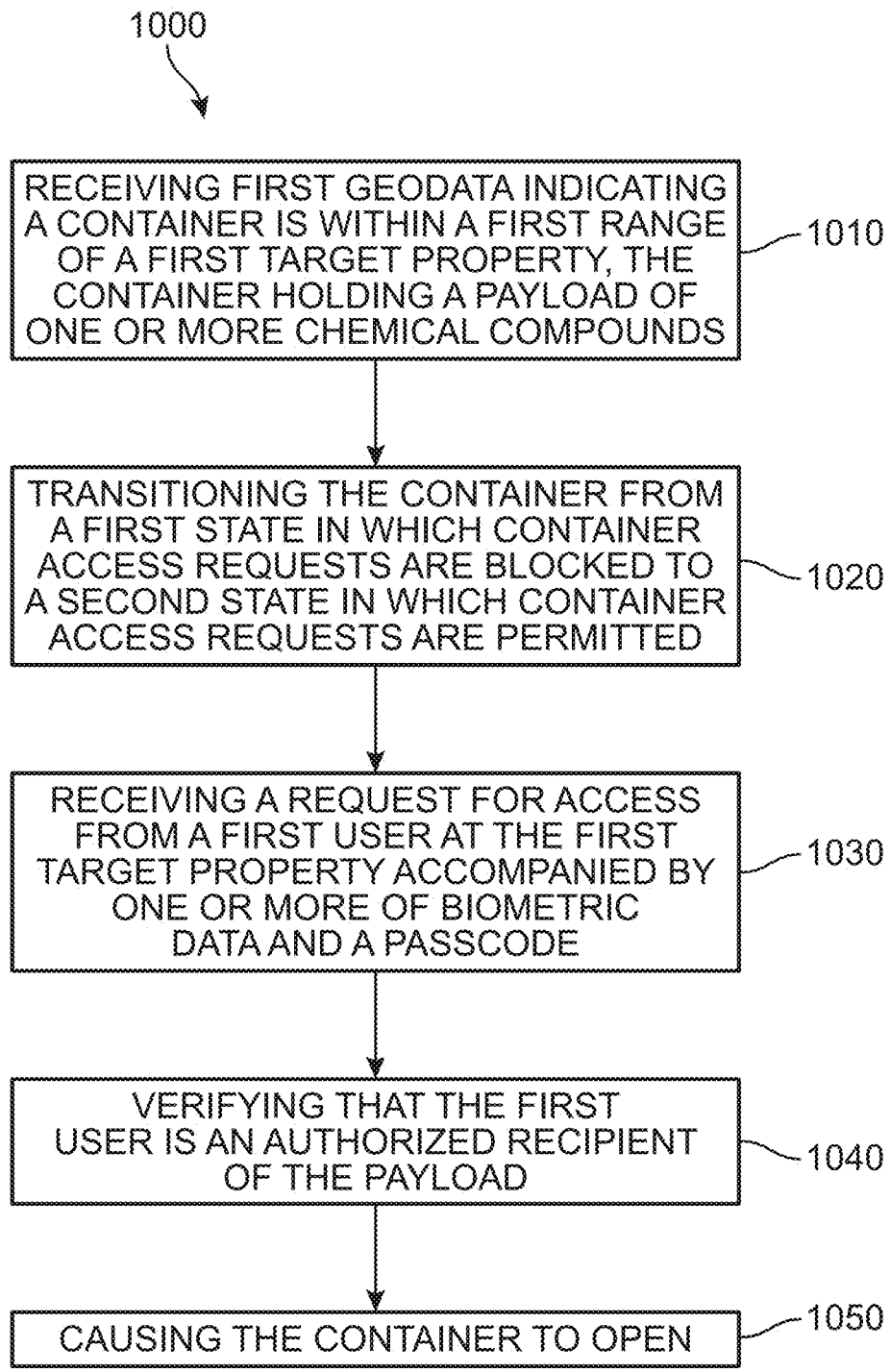
FIG. 10 is a flow chart depicting a process for secure pharmaceutical transportation, according to an embodiment

FIG. 10 is a flow chart illustrating an embodiment of a method 1000 of secure pharmaceutical transportation for delivery of its payload to an authorized recipient. The method 1000 includes a first step 1010 of receiving at a first time, at an onboard computing system for a container and from an onboard location sensor, first geodata indicating the container is within a first range of a first target property, the container holding a payload of one or more chemical compounds. The method 1000 also includes a second step 1020 of transitioning, responsive to receiving the first geodata, the container from a first state in which container access requests are blocked to a second state in which container access requests are permitted. A third step 1030 includes receiving at a second time after the first time, at the onboard computing system, a first request for access from a first user at the first target property, the request accompanied by one or more of biometric data and a passcode. Furthermore, a fourth step 1040 includes verifying that the first user is an authorized recipient of the payload. A fifth step 1050 includes causing, via the onboard computing system and responsive to the verification, the container to open. In some embodiments, the verification signal can trigger a release of a lock.

In other embodiments, the method may include additional steps or aspects. In some embodiments, the method also includes transporting the container from an initial location where the payload was secured in the container to the first target property via a drone. In some embodiments, the first request is generated via a mobile device associated with the first user at the first target property. In another example, the first request is generated via a container management software application accessed via the mobile device. In some embodiments, the method also includes receiving, by the container management software application, a biometric data reference record that is used to verify whether the first user is an authorized recipient. In one example, the biometric data is collected by a sensor installed on along an exterior of the container.

In some embodiments, the method further includes steps of receiving at a third time prior to the first time, at the onboard computing system and from the onboard location sensor, second geodata indicating the container is outside the first range of the first target property; receiving, after the third time and prior to the first time, a second request for access from a second user; and blocking, responsive to receiving the second geodata, the second request. In another embodiment, the container includes a tamper response module that causes the one or more chemical compounds to be rendered inert in cases where a tamper event is detected. In some embodiments, the container includes a cooling system for maintaining an interior chamber of the container in a temperature range suited to protecting a potency of the one or more compounds.

Other methods may be contemplated within the scope of the present disclosure. For example, in some embodiments, a method of safeguarding pharmaceuticals stored in a container is disclosed. The method includes a first step of receiving at a first time, at an onboard computing system for a container and from an onboard impact sensor, first data indicating the container has experienced a tamper event in which an unauthorized person attempted to use force to open the container, the container holding a payload of one or more chemical compounds. A second step includes automatically triggering, responsive to receiving the first data and via the onboard computing system, a tamper reaction including a release of a neutralizing agent that causes a degradation of the one or more chemical compounds.

In such embodiments, the method may include additional steps or aspects. For example, in some embodiments, the tamper reaction causes an airtight enclosure in which gas molecules of the neutralizing agent are stored to open, allowing the gas molecules to come into contact with the one or more chemical compounds. In another example, the tamper reaction causes a liquid including the neutralizing agent to be poured onto the one or more chemical compounds. In some embodiments, the payload is stored in a packaging comprising a material that is permeable to the neutralizing agent.

As described herein, some of the proposed embodiments can be understood to include a secure container that can be delivered to an address and stringently control access to its contents based on multiple layers of authentication. The container can include one or more cameras mounted in an interior and/or an exterior of the container, and a GPS-enabled device configured to generate location geodata for the container in real-time. A GPS provides latitude-longitude coordinates gathered by the hardware on the device which communicates with a satellite. The latitude/longitude coordinates generated by the GPS can also be referred to herein interchangeably as location data or geodata. The container also includes an onboard computing system configured to trigger various safeguarding mechanisms in response to detection of a tamper event, and a rechargeable power source supplying power to the cameras, the sensors, the GPS device, and the computing system.

In some embodiments, the computing system is also configured to deactivate or block any attempts at access of the container's contents in response to geodata indicating the container has moved outside the vicinity of the target property. In some embodiments, the container also includes a sensor device, the sensor device being one of an accelerometer, gyroscope, infrared light sensor, proximity sensor, and temperature sensor. In one example, the exterior surface of the container includes a flame-resistant coating.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

The computing devices and systems described herein may include one or more processors, a memory, one or more storage devices, and one or more input/output (I/O) devices controllable via one or more I/O interfaces. The various components may be interconnected via at least one system bus, which may enable the transfer of data between the various modules and components of the system.

The processor(s) may be configured to process instructions for execution within the system. The processor(s) may include single-threaded processor(s), multi-threaded processor(s), or both. The processor(s) may be configured to process instructions stored in the memory or on the storage device(s). The processor(s) may include hardware-based processor(s) each including one or more cores. The processor(s) may include general purpose processor(s), special purpose processor(s), or both. The memory may store information within the system. In some implementations, the memory includes one or more computer-readable media. The memory may include any number of volatile memory units, any number of non-volatile memory units, or both volatile and non-volatile memory units. The memory may include read-only memory, random access memory, or both.

In some examples, the memory may be employed as active or physical memory by one or more executing software modules.

The storage device(s) may be configured to provide (e.g., persistent) mass storage for the system. In some implementations, the storage device(s) may include one or more computer-readable media. For example, the storage device(s) may include a floppy disk device, a hard disk device, an optical disk device, or a tape device. The storage device(s) may include read-only memory, random access memory, or both. The storage device(s) may include one or more of an internal hard drive, an external hard drive, or a removable drive.

One or both of the memory or the storage device(s) may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system. In some implementations, the CRSM may include a data store that provides storage of computer-readable instructions or other information in a non-transitory format. The CRSM may be incorporated into the system or may be external with respect to the system. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) and the memory may be supplemented by, or incorporated into, one or more application-specific integrated circuits (ASICs).

The system may include one or more I/O devices. The I/O device(s) may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) may also include one or more output devices such as a display, LED(s), an audio output device (e.g., a speaker), a printer, a haptic output device, and so forth. The I/O device(s) may be physically incorporated in one or more computing devices of the system, or may be external with respect to one or more computing devices of the system.

The system may include one or more I/O interfaces to enable components or modules of the system to control, interface with, or otherwise communicate with the I/O device(s). The I/O interface(s) may enable information to be transferred in or out of the system, or between components of the system, through serial communication, parallel communication, or other types of communication. For example, the I/O interface(s) may comply with a version of the RS-232 standard for serial ports, or with a version of the IEEE 1284 standard for parallel ports. As another example, the I/O interface(s) may be configured to provide a connection over Universal Serial Bus (USB) or Ethernet. In some examples, the I/O interface(s) may be configured to provide a serial connection that is compliant with a version of the IEEE 1394 standard. The I/O interface(s) may also include one or more network interfaces that enable communications between computing devices in the system, or between the system and other network-connected computing systems. The network interface(s) may include one or more network interface controllers (NICs) or other types of transceiver devices configured to send and receive communications over one or more networks, such as the network(s), using any network protocol.

Computing devices of the system may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANS (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random-access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a GPS receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet. The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for secure pharmaceutical transportation, the method comprising:
    receiving at a first time, at an onboard computing system for a container and from an onboard location sensor, first geodata indicating the container is within a first range of a first target property, the container holding a payload of one or more chemical compounds, wherein:

the container includes a tamper response module that causes the one or more chemical compounds to be rendered inert in cases where a tamper event is detected, the tamper response module, when a tamper event is detected, is configured to cause a release of a liquid or a gas that includes a neutralizing agent into the container, and the payload is stored in a packaging comprising a material that is permeable to the neutralizing agent;

transitioning, responsive to receiving the first geodata, the container from a first state in which container access requests are blocked to a second state in which container access requests are permitted;

receiving at a second time after the first time, at the onboard computing system, a first request for access from a first user at the first target property, the request accompanied by one or more of biometric data and a passcode;

verifying that the first user is an authorized recipient of the payload; and causing, via the onboard computing system and responsive to the verification, the container to open.

2. The method of claim 1, further comprising transporting the container from an initial location where the payload was secured in the container to the first target property via a drone.

3. The method of claim 1, wherein the first request is generated via a mobile device associated with the first user at the first target property.

4. The method of claim 3, wherein the first request is generated via a container management software application accessed via the mobile device.

5. The method of claim 4, further comprising receiving, by the container management software application, a biometric data reference record that is used to verify whether the first user is an authorized recipient.

6. The method of claim 1, wherein the biometric data is collected by a sensor installed on along an exterior of the container.

7. The method of claim 1, further comprising:
receiving at a third time prior to the first time, at the onboard computing system and from the onboard location sensor, second geodata indicating the container is outside the first range of the first target property;
receiving, after the third time and prior to the first time, a second request for access from a second user; and
blocking, responsive to receiving the second geodata, the second request.

8. The method of claim 1, wherein the tamper response module is triggered when sensor data indicates an occurrence of an unauthorized attempt to open the container.

9. The method of claim 1, wherein the container includes a cooling system for maintaining an interior chamber of the container in a temperature range suited to protecting a potency of the one or more compounds.

10. A system for secure pharmaceutical transportation, the system comprising a processor and machine-readable media including instructions which, when executed by the processor, cause the processor to:
receive at a first time, at an onboard computing system for a container and from an onboard location sensor, first geodata indicating the container is within a first range of a first target property, the container holding a payload of one or more chemical compounds, wherein:
the container includes a tamper response module that causes the one or more chemical compounds to be rendered inert in cases where a tamper event is detected, the tamper response module, when a tamper event is detected, is configured to cause a release of a liquid or a gas that includes a neutralizing agent into the container, and the payload is stored in a packaging comprising a material that is permeable to the neutralizing agent;

transition, responsive to receiving the first geodata, the container from a first state in which container access requests are blocked to a second state in which container access requests are permitted;

receive at a second time after the first time, at the onboard computing system, a first request for access from a first user at the first target property, the request accompanied by one or more of biometric data and a passcode;

verify that the first user is an authorized recipient of the payload; and cause, via the onboard computing system and responsive to the verification, the container to open.

11. The system of claim 10, wherein the first request is generated via a mobile device associated with the first user at the first target property.

12. The system of claim 11, wherein the first request is generated via a container management software application accessed via the mobile device.

13. The system of claim 12, wherein the instructions further cause the processor to receive, by the container management software application, a biometric data reference record that is used to verify whether the first user is an authorized recipient.

14. The system of claim 10, wherein the biometric data is collected by a sensor installed on along an exterior of the container.

15. The system of claim 10, wherein the instructions further cause the processor to:
receive at a third time prior to the first time, at the onboard computing system and from the onboard location sensor, second geodata indicating the container is outside the first range of the first target property;
receive, after the third time and prior to the first time, a second request for access from a second user; and
block, responsive to receiving the second geodata, the second request.

16. The system of claim 10, wherein the tamper response module is triggered when sensor data indicates an occurrence of an unauthorized attempt to open the container.

17. The system of claim 16, wherein a tamper event includes attempts to open the container involving force that could potentially destabilize the container's integrity.

18. The system of claim 10, wherein an exterior portion of the container includes a flame-resistant coating.

19. The system of claim 10, wherein portions of an outer wall of the container are buoyant and/or inflate upon submersion in water.

20. The system of claim 10, wherein the container includes a cooling system for maintaining an interior chamber of the container in a temperature range suited to protecting a potency of the one or more compounds.

* * * * *